United States Patent [19]
Jaisle et al.

[11] Patent Number: 6,056,257
[45] Date of Patent: May 2, 2000

[54] SEAT ADJUSTER FOR A VEHICLE

[75] Inventors: Jeffrey T. Jaisle, Farmington Hills; John M. Perraut, Rochester Hills, both of Mich.

[73] Assignee: Lear Corporation, Southfield, Mich.

[21] Appl. No.: 09/035,487

[22] Filed: Mar. 5, 1998

Related U.S. Application Data

[60] Provisional application No. 60/049,808, Jun. 17, 1997.

[51] Int. Cl.[7] .................................................. F16M 13/00
[52] U.S. Cl. .......................... 248/424; 248/429; 248/393
[58] Field of Search ..................... 248/393, 394, 248/395, 396, 397, 419, 420, 424, 429; 297/344.1, 330

[56] References Cited

U.S. PATENT DOCUMENTS

| | | | |
|---|---|---|---|
| 5,224,749 | 7/1993 | Gauger et al. | 296/65.1 |
| 5,242,143 | 9/1993 | Nagashima et al. | 248/345.1 |
| 5,568,908 | 10/1996 | Kisiel | 248/419 |
| 5,707,035 | 1/1998 | Kargol et al. | 248/429 |
| 5,797,576 | 8/1998 | Gauger et al. | 248/429 |

*Primary Examiner*—Anita M. King
*Assistant Examiner*—Gwendolyn Baxter
*Attorney, Agent, or Firm*—Brooks & Kushman P.C.

[57] ABSTRACT

A power seat adjuster includes first and second side rail assemblies, each formed of a plastic outer member and a substantially tubular inner member. One of the outer member and inner member is fixed to the vehicle. The other of the outer member and inner member is movably disposed with respect to the one outer member and inner member. An elevation assembly is coupled between the movable one of the outer member and inner member and a seat support member for elevating the seat support member relative to the first and second side rail assemblies. The elevation assembly includes plastic piano-type drive hinges.

29 Claims, 9 Drawing Sheets

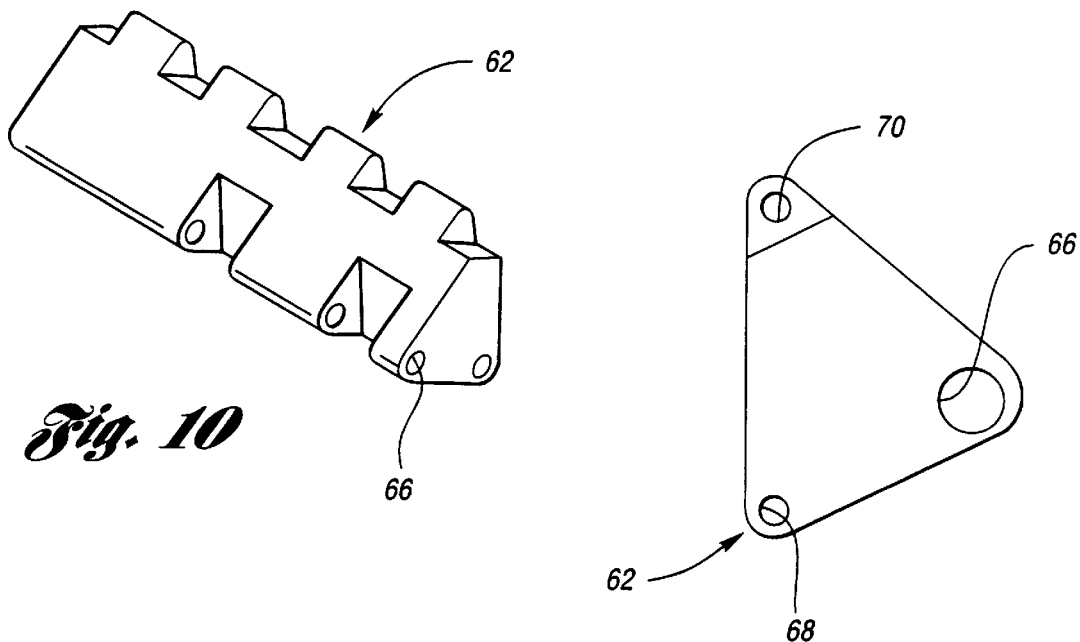
Fig. 10
Fig. 11
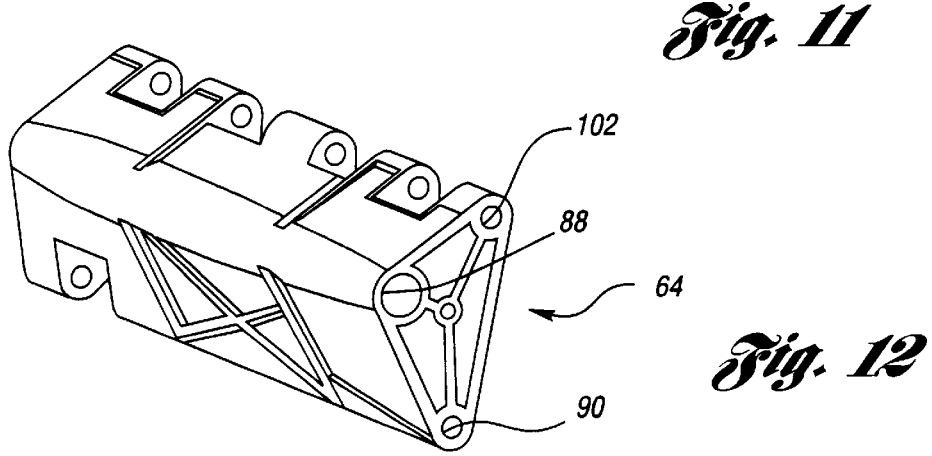
Fig. 12
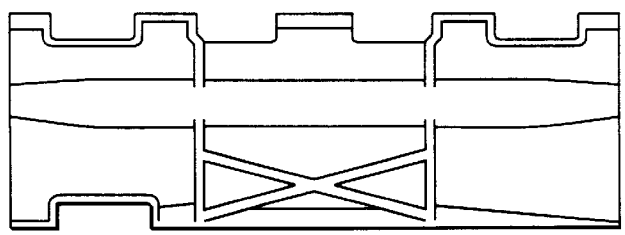
Fig. 13

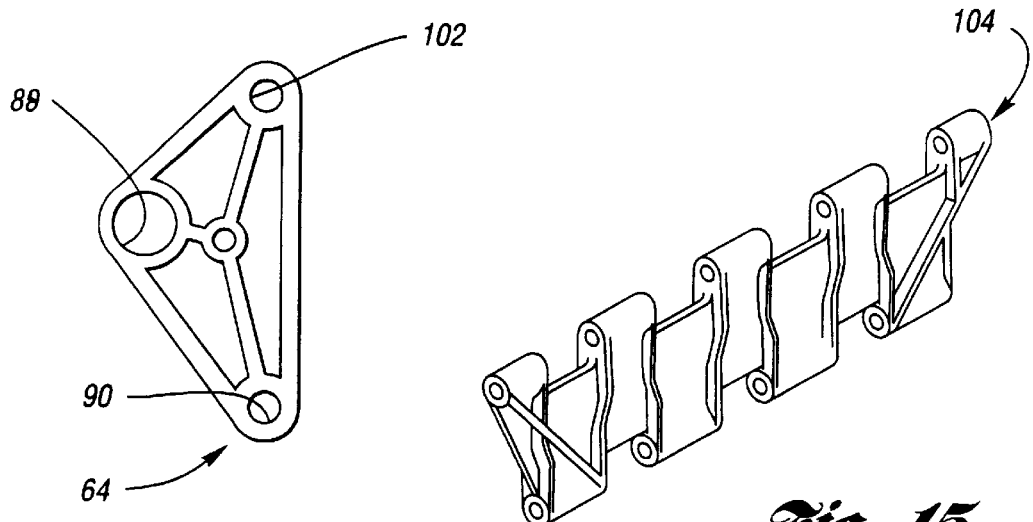
Fig. 14
Fig. 15
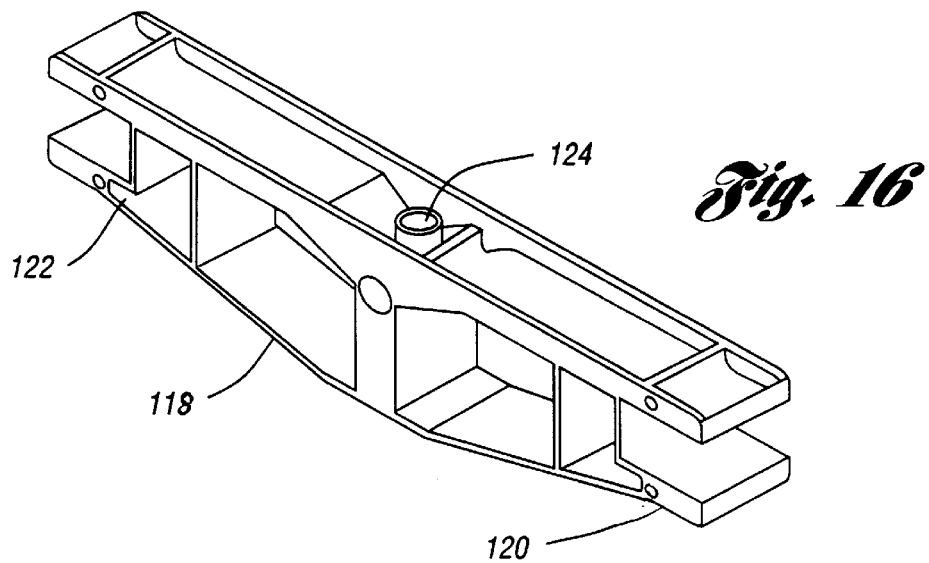
Fig. 16
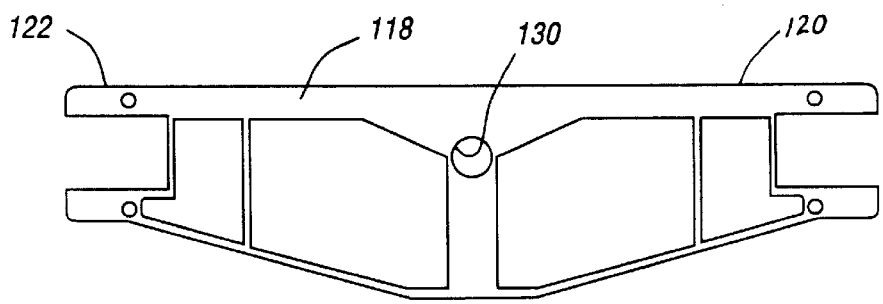
Fig. 17

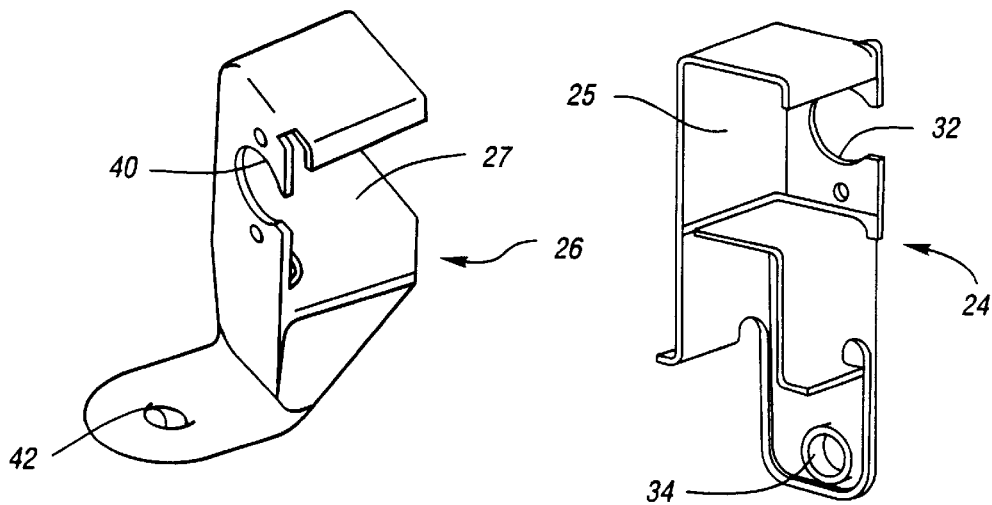
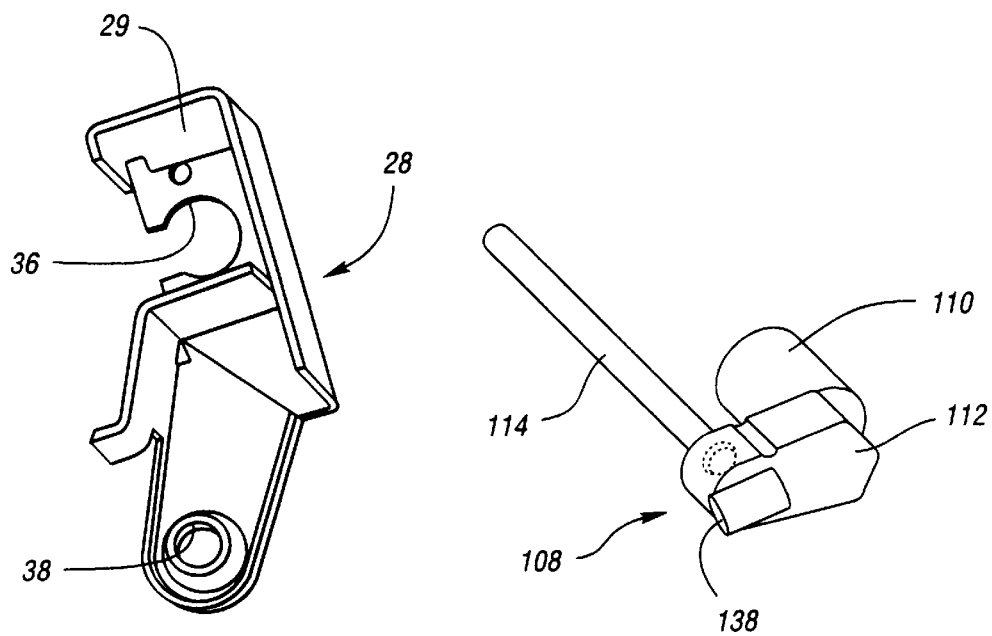

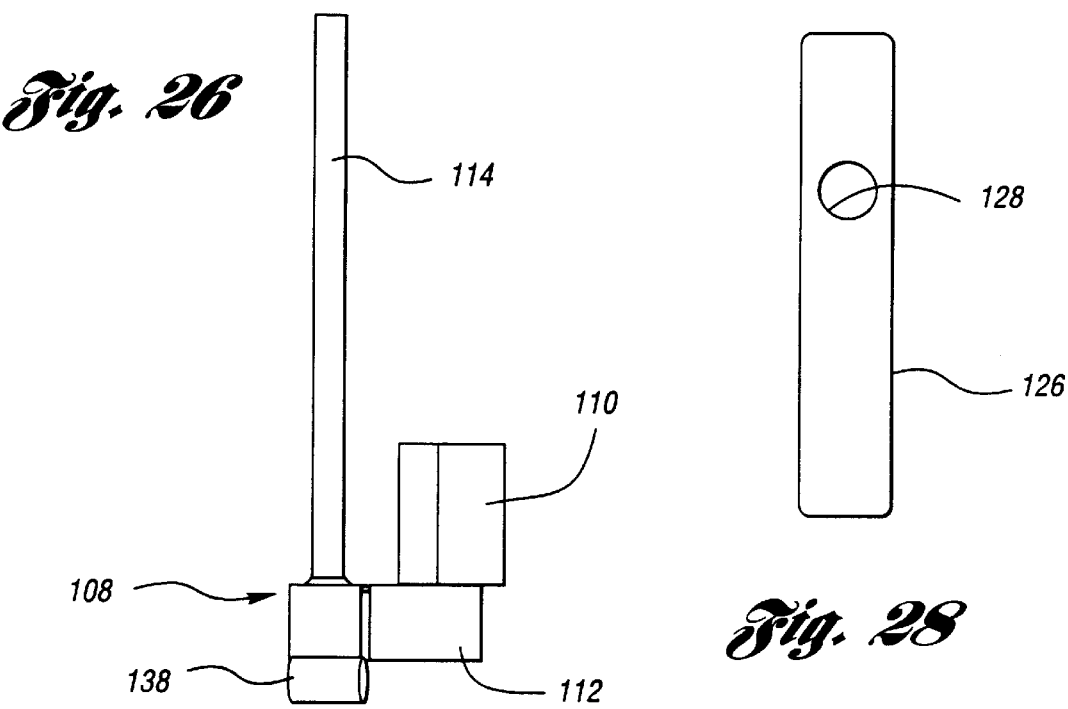
Fig. 26
Fig. 28
Fig. 27
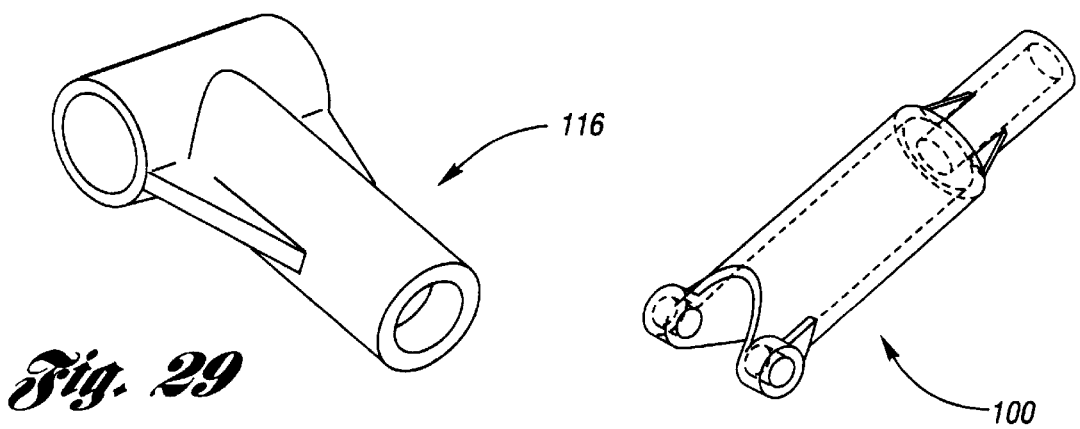
Fig. 29
Fig. 30

SEAT ADJUSTER FOR A VEHICLE

CROSS-REFERENCE TO RELATED APPLICATION

This application is based upon earlier filed, commonly owned provisional application Ser. No. 60/049,808 filed Jun. 17, 1997, which is hereby incorporated by reference in its entirety.

TECHNICAL FIELD

The present invention relates to a seat adjuster for a vehicle, and more particularly to a seat adjuster with tubular side rail assemblies formed at least partially of extruded plastic.

BACKGROUND OF THE INVENTION

Vehicle seat assemblies are usually provided with a seat adjuster for adjusting the horizontal fore and aft position of an upper track movably mounted in a lower track fixed to the vehicle and, in some cases, with a seat recliner for adjusting the angular position and height of a pivotal seat back with respect to a seat track assembly mounted on the vehicle floor. Such assemblies typically comprise a sliding mechanism to allow sliding movement of the upper track with respect to the lower track. The sliding mechanism is typically a roller, bearing, sliding sleeve, or simply mating metal sliding components.

Such structure may not have a desirable smooth sliding motion and stability of all moving components as a result of looseness due to stack up of tolerances between the mating metal components. A further problem with such structures is that they include numerous welds, rivets or threaded fasteners to hold the various metal components together, which distort the track inhibiting the smooth operation and adding substantial manufacturing costs to the assembly.

Another problem with such mating metal sliding upper and lower seat track members is the amount of noise generated by such an assembly. The power adjuster motor noise may peak due to mechanical advantage changes affecting motor operation, and the metal components tend to resonate noise from the assembly.

A further problem with typical prior art power seat adjusters is that such assemblies typically comprise around 150 to 200 different components, which results in substantial manufacturing costs.

Accordingly, it is desirable to overcome the above-referenced shortcomings of prior art power seat adjuster assemblies by reducing part count, reducing looseness of all moving components, and reducing noise of the assembly.

DISCLOSURE OF THE INVENTION

The present invention overcomes the above-referenced shortcomings of prior art power seat adjuster assemblies by providing a simplified design which includes first and second side rail assemblies including at least one outer member and at least one substantially tubular inner member, at least one of which is formed of plastic. The tubular structure improves stability and reduces looseness between the relatively sliding members, and the use of plastic reduces resonance of the assembly and dampens vibration to reduce noise. The use of plastic linkage components enables interference fits to eliminate looseness while reducing the number of parts.

More specifically, the present invention provides a seat adjuster for a vehicle, including first and second side rail assemblies. Each side rail assembly is formed of at least one outer member and at least one substantially tubular inner member. One of the outer and inner members are fixed to the vehicle. The other of the outer and inner members is movably disposed with respect to the one outer member and inner member. An elevation assembly is coupled between the movable one of the outer member and inner member and a seat support member for elevating the seat support member relative to the first and second side rail assemblies.

Preferably, each outer member comprises an extruded plastic material, and each inner member comprises a steel tube. Each outer member comprises a substantially C-shaped cross-section with an interference fit with the inner member such that the C-shaped cross-section provides a spring load around the inner member to form a snug fit to prevent looseness of the assembly.

Each outer member also preferably includes a plurality of longitudinally extending steel support rods or tubes therein. Also, the elevation assembly preferably includes front and rear plastic drive hinges rotatably connected to opposing ends of the movable one of the inner and outer members.

Another aspect of the invention includes first and second movable side rail members with first and second cross members extending therebetween, wherein the cross members are rigidly, non-pivotally mounted to the first and second movable side rail members. This rigid mounting of the cross members to the movable side rail members provides many advantages, such as a simplified assembly, improved load distribution, improved structural integrity, and elimination of welding operations. It also enables the use of plastic, piano-type drive hinges pivotally connected to the cross members to form a seat elevation assembly. This configuration also enables pivotal attachment of a drive assembly directly to the cross members, thereby eliminating the typical brackets and welds associated with a drive assembly.

Another feature of the invention is the substantially plastic horizontal drive bracket extending between fixed side rails and having a threaded horizontal drive nut supported therein. A horizontal drive screw is supported at opposing ends by the first and second cross members, such that the horizontal drive screw is engaged with the threaded horizontal drive nut for actuating movement of the first and second movable side rails with respect to the first and second fixed side rails. The horizontal drive bracket is preferably a plastic component which is reinforced by a sheet metal support plate for added structural integrity.

Still another important feature of the invention is that the front and rear risers form pockets to substantially enclose the opposing ends of the plastic fixed side rail members for added structural integrity. This configuration enables the use of lightweight plastic or aluminum fixed side rail members for weight reduction and manufacturing cost reduction.

Accordingly, an object of the present invention is to provide a power seat adjuster with reduced looseness and reduced noise.

Another object of the present invention is to provide a power seat adjuster with first and second side rail assemblies including inner and outer substantially tubular members which slide relatively for seat adjustment.

A further object of the invention is to provide a power seat adjuster employing extruded plastic at least partially tubular side rail components forming a snug fit with relatively sliding inner tubular members.

A further object of the invention is to provide a power seat adjuster for a vehicle with a reduced part count and a substantial reduction in the amount of welds, rivets and fasteners required for the assembly.

Another object of the invention is to provide an improved seat assembly which is simplified, and provides improved load distribution, improved structural integrity, and a reduction in welds.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 10 shows a perspective view of a front drive hinge in accordance with the present invention;

FIG. 11 shows an end view of the front drive hinge of FIG. 10;

FIG. 12 shows a perspective view of a rear drive hinge in accordance with the present invention;

FIG. 13 shows a side view of the rear drive hinge of FIG. 12;

FIG. 14 shows an end view of the rear drive hinge of FIG. 13;

FIG. 15 shows a perspective view of a motion link in accordance with the present invention;

FIG. 16 shows a perspective view of a lower horizontal drive bracket in accordance with the present invention;

FIG. 17 shows a side view of the lower drive bracket shown in FIG. 16;

FIG. 22 shows a perspective view of a rear riser in accordance with the present invention;

FIG. 23 shows a perspective view of a front outboard riser in accordance with the present invention;

FIG. 24 shows a perspective view of a front inboard riser in accordance with the present invention;

FIG. 25 shows a perspective view of a horizontal drive actuator in accordance with the present invention;

FIG. 26 shows a plan view of the horizontal actuator of FIG. 25;

FIG. 27 shows a cut-away side view of a horizontal lead screw for use with the present invention;

FIG. 28 shows a side view of a horizontal drive nut in accordance with the present invention;

FIG. 29 shows a perspective view of a "T" Bushing in accordance with the present invention; and FIG. 30 shows a perspective view of a vertical drive nut in accordance with the present invention.

DETAILED DESCRIPTION OF THE PREFERRED EMBODIMENT

Figure 1:
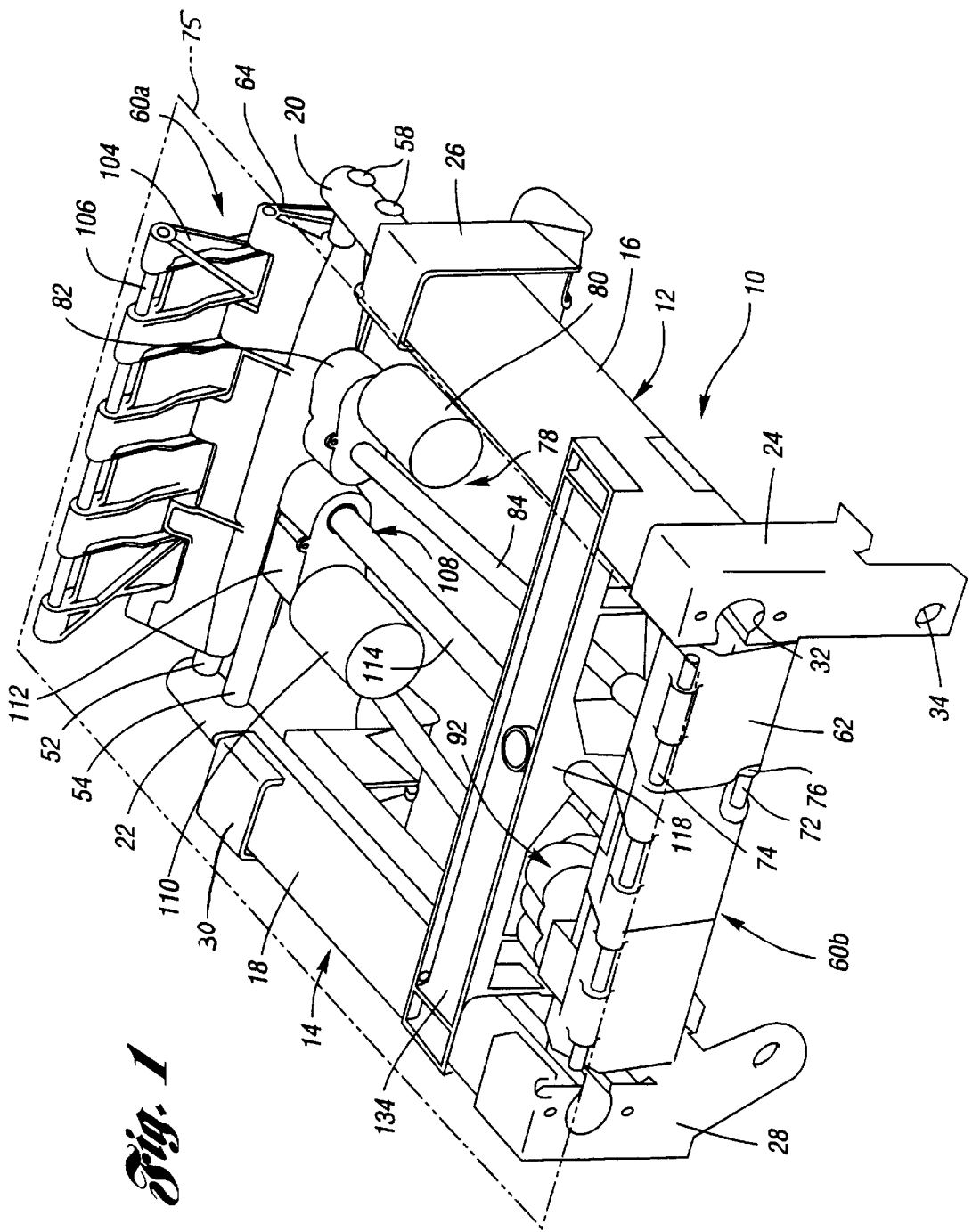
FIG. 1 shows a perspective view of a power seat adjuster assembly in accordance with the present invention.
Figure 2:
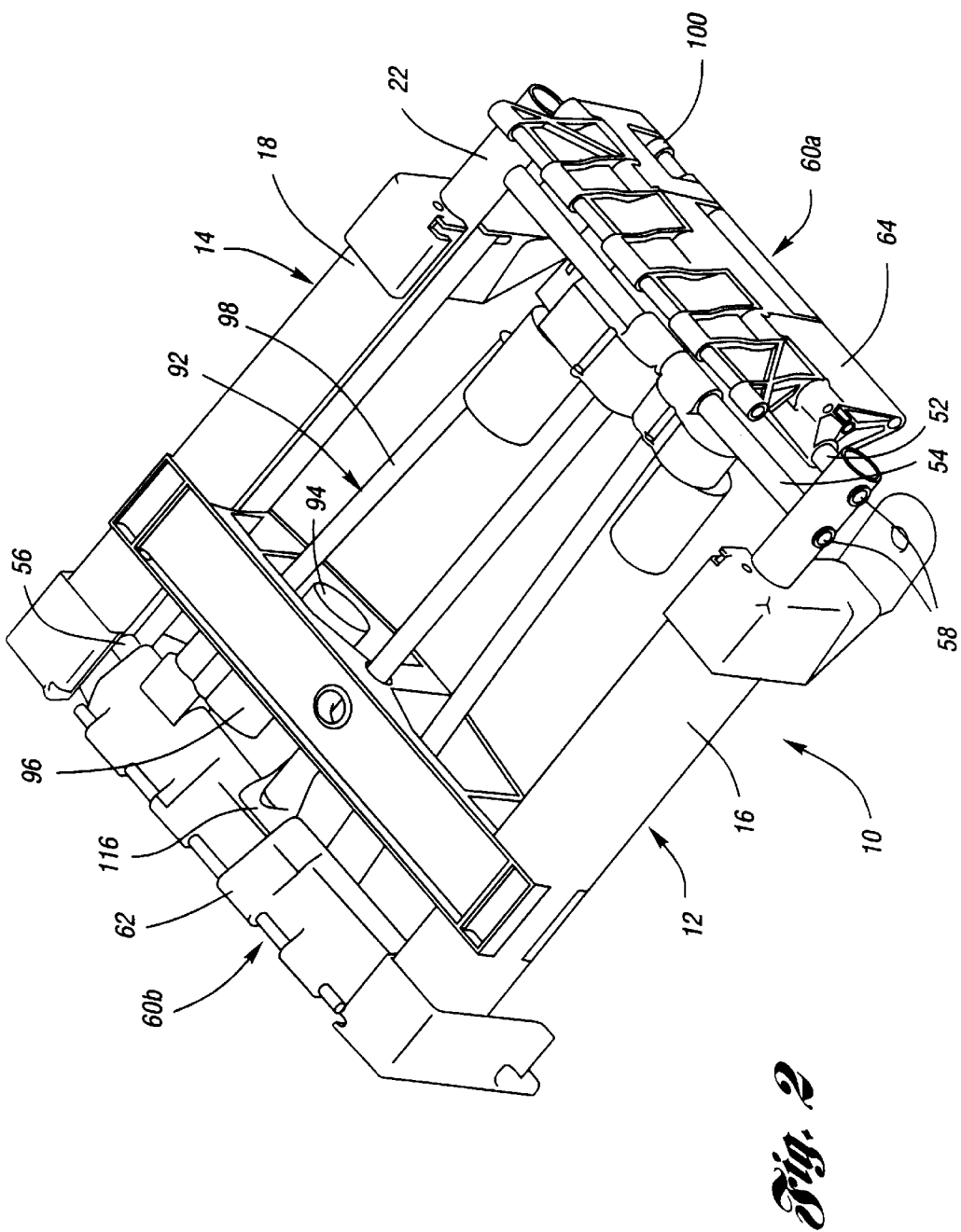
FIG. 2 shows a reverse perspective view of the power seat adjuster assembly of FIG. 2.
Figure 3:
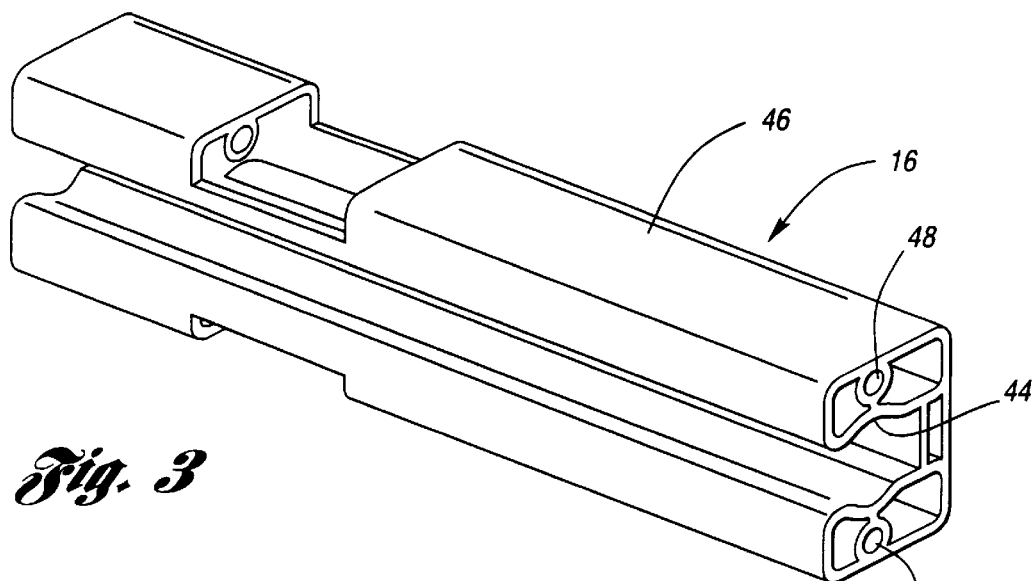
FIG. 3 shows a perspective view of an outer rail in accordance with the present invention.
Figure 4:
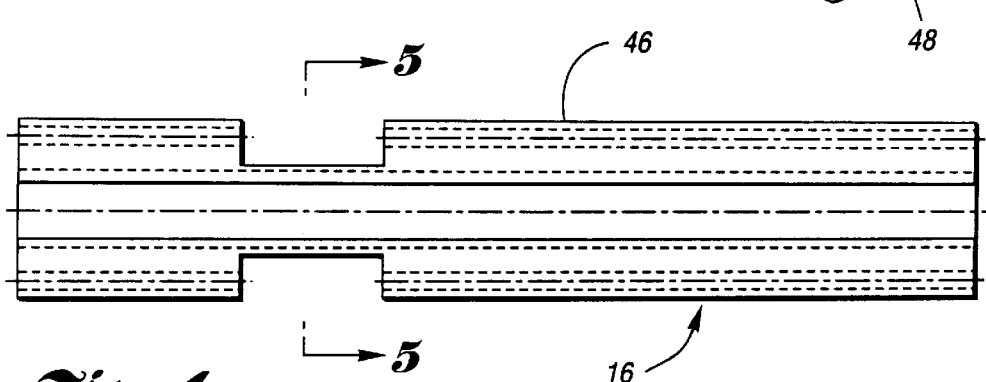
FIG. 4 shows a side view of the outer rail of FIG. 3.
Figure 5:
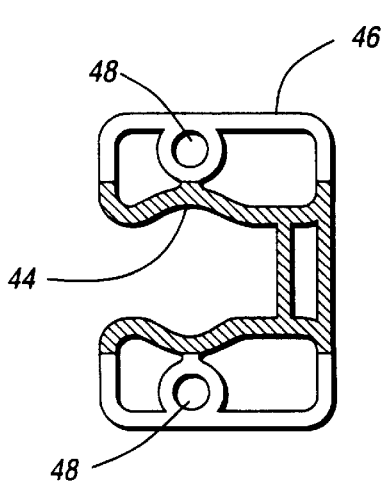
FIG. 5 shows a sectional view taken at line 5—5 of FIG. 4.
Figure 6:
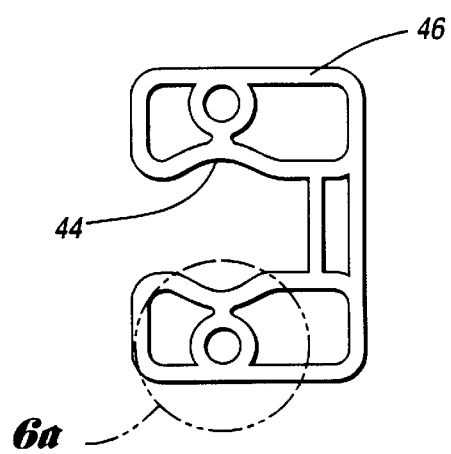
FIG. 6 shows an end view of the side rail of FIG. 4.
Figure 6A:
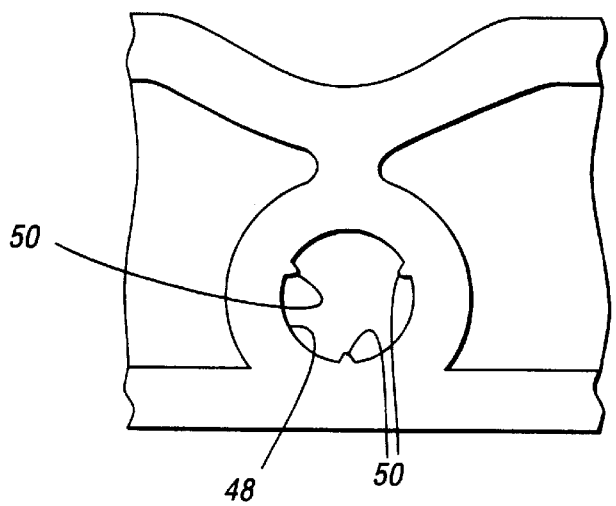
FIG. 6a shows an enlarged view of detail 6a from FIG. 6.

Referring to FIGS. 1 and 2, opposing perspective views are shown of a power seat adjuster assembly 10 for use in adjusting vehicle seat position in accordance with the present invention. The assembly 10 includes first and second side rail assemblies 12,14 which allow horizontal adjustment of the vehicle seat with respect to the vehicle floor.

Each of the first and second side rail assemblies 12,14 include an at least partially tubular outer member 16,18 which receives a tubular inner member 20,22, respectively, therein.

The outer members 16,18 are mounted at opposing ends to the vehicle floor by front and rear risers 24, 26, 28, 30, respectively. Accordingly, the outer members 16,18 are supported in a stationary position within the vehicle. A more detailed view of a front outboard riser 24 is shown in FIG. 23. As shown, the front outboard riser 24 includes an aperture 32 for receiving the tubular inner member 20 and at least one mounting hole 34 is provided for attachment to the vehicle. Similarly, front inboard riser 28 is shown in greater detail in FIG. 24. Front inboard riser 28 also includes an aperture 36 for receiving the inner tubular member 22, and a mounting hole 38 for attachment to the vehicle floor.

Also, referring to FIG. 22, a rear riser 26 is shown. The rear riser 26 includes an aperture 40 for receiving the inner tubular member 20, as well as a mounting hole 42 for mounting on the vehicle floor.

As shown in FIGS. 22–24, the risers 24, 26, 28 include pockets 25,27,29 formed therein for substantially enclosing the opposing ends of the outer members 16,18 for added structural integrity. This configuration enables the use of lighter side rails (outer members) 16,18, such as plastic or aluminum because the pockets 25,27,29 structurally bolster the side rails.

Typically, a high energy impact load passes through the horizontal drive train in a load path between the occupant, lap belt and upper track, to the lower track and riser. In order to withstand this load, a catcher bracket is used to retain the end of the lead screw as described in U.S. Pat. No. 5,316, 258. However, with the novel riser design of the present invention, under large deformations, the riser will cinch the moving and non-moving parts of the track together, bypassing the horizontal drive train to create a more direct path to the riser, and to the vehicle body while maintaining the traveling buckle comfort feature.

Returning to FIGS. 1 and 2, the outer members 16,18 preferably comprise an extruded plastic material, and each inner member 20,22 comprises a hollow steel tube.

Figure 7:
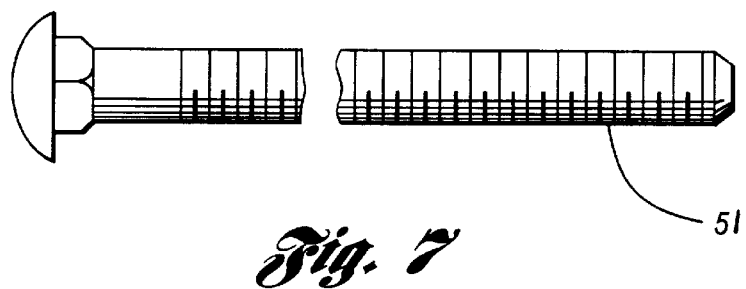
FIG. 7 shows a cut-away side view of an outer reinforcement rod for use with the present invention.

Referring to FIGS. 3–6a, the outer member 16 comprises a substantially tubular inner portion 44 configured to slidably receive the inner tubular member 20. Preferably, an interference fit is provided between the inner tubular member 20 and the tubular inner portion 44 of the outer member 16 in order to provide smooth sliding action and a snug fit therebetween. The substantially tubular inner portion 44 is supported within a substantially rectangular support tube 46, and elongated hollow channels 48 are formed along the length of the outer member 16 for receiving longitudinally extending steel support rods therein. Protrusions 50 are provided within the hollow channels 48 to provide a snug fit with the steel support rods therein. One such steel support rod 51 is shown in FIG. 7. Preferably, the support rod 51 is only threaded at opposing ends. The support rod 51 not only acts to reinforce the outer member, but also is rigidly attached at opposing ends to the risers, and is further attached at a middle portion to the upper horizontal drive bracket 134, described below.

The interference fit between the substantially tubular inner portion 44 and the inner tubular member 22 provides a spring-load which results in a tight fit, which provides stability in moving components and eliminates looseness. The plastic outer members 16,18 also act as vibration dampeners which reduces noise.

Figure 8:
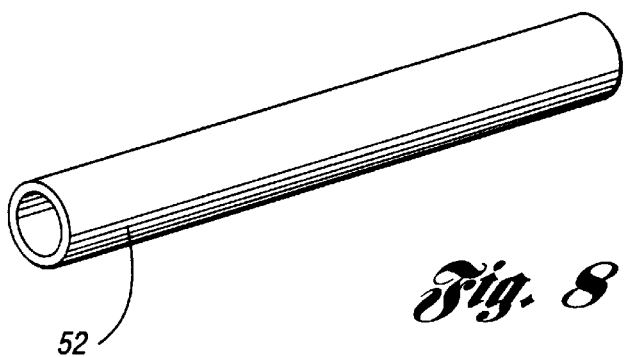
FIG. 8 shows a perspective view of a cross tube in accordance with the present invention.
Figure 9:
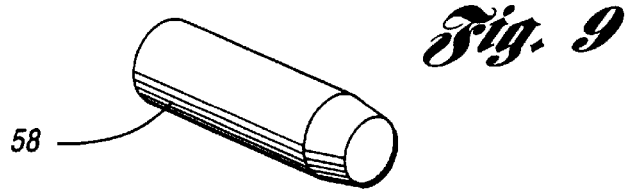
FIG. 9 shows a perspective view of a dowel pin in accordance with the present invention.
Figure 18:
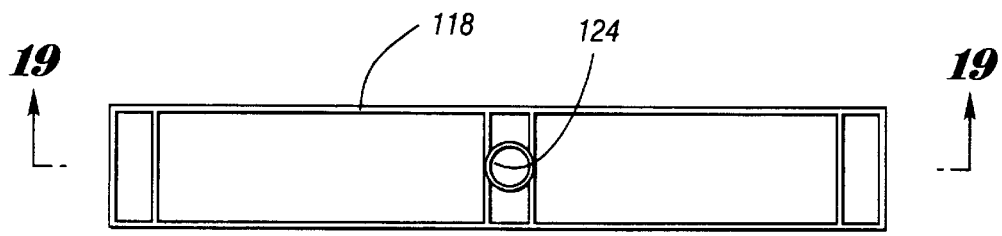
FIG. 18 shows a top view of the lower drive bracket of FIG. 17.
Figure 19:
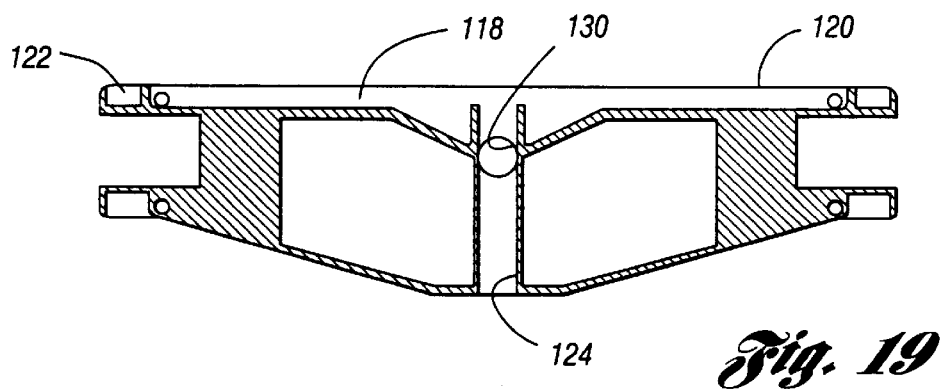
FIG. 19 shows a sectional view taken at line 19—19 of FIG. 18.

Referring to FIGS. 1, 2, 8 and 9, hollow steel cross tubes 52,54,56 extend between the opposing ends of the inner tubular members 20,22. A sample hollow steel cross tube 52 is shown in FIG. 8. A dowel pin 58, as shown in FIG. 9, is plugged into the ends of each cross tube 52,54,56 in order to expand the respective end of the cross tubes to engage the cross tubes with the inner tubular members 20,22, thereby eliminating welding operations.

Because the cross tubes 52,54,56 are fixed (non-pivotal) to the movable tubular members, substantial advantages are achieved, such as a simplified assembly, improved load distribution, improved structural rigidity, and elimination of welds. Typically, the pivotal attachment of a seat support member to a movable side rail is achieved by pivotally connecting the crossbar to the movable side rail. With the present invention, the cross-bar is rigidly connected to the movable side rail, which simplifies the attachment and provides the other advantages listed above. Another major advantage of this configuration is that it enables the use of a plastic piano-hinge type structure for a seat elevation assembly, as described below.

An elevation assembly 60a,60b, shown in FIGS. 1 and 2, is coupled between the tubular inner members 20,22 and a seat support member (not shown) for elevating the seat support member relative to the first and second side rail assemblies 12,14 for seat adjustment. The elevation assembly 60a,60b includes a plastic front (piano-type) drive hinge 62 pivotally coupled to the cross tube 56, and a rear (piano-type) drive hinge 64 pivotally coupled to the cross tube 52. The rigid mounting of the cross-tubes 52,56 to the movable side rails enables this pivotal attachment of plastic piano-type hinges, which reduces weight and reduces manufacturing costs, while also reducing assembly costs. The front drive hinge 62 is shown in greater detail in FIGS. 10 and 11. As shown, the front drive hinge 62 is generally triangular in cross-section which provides a large, sturdy cross-section, and includes aperture 66 for receiving the cross tube 56. Second and third apertures 68,70 are also provided for receiving the steel rods 72,74, respectively, as shown in FIG. 1.

The steel rod 74 is adapted to be attached to a vehicle seat support member 75 (shown schematically in phantom in FIG. 1), and steel rod 72 is pivotally connected by a vertical drive nut 76, shown in FIG. 1, for rotating the front drive hinge 62. In order to rotate the front drive hinge 62, the vertical drive assembly 78 is provided. The vertical drive assembly 78 includes a motor 80, gear box 82, and drive screw 84, which engages the vertical drive nut 76 for rotating the front drive hinge 62 when the motor 80 is actuated. The vertical drive assembly 78 is pivotally mounted on the steel cross tube 54. This is another advantage of the rigidly mounted cross tubes 52,54,56. The pivotal attachment of the drive assembly 78 directly onto the cross tubes eliminates the welded brackets used in prior art assemblies.

Similarly, the rear drive hinge 64, shown in FIGS. 1, 2 and 12–14, includes a first aperture 88 for receiving the steel tube 52. A second aperture 90 is provided for receiving another steel rod which is configured to engage the vertical drive assembly 92 for actuating pivotal movement of the rear drive hinge 64. The vertical drive assembly 92 includes a drive motor 94, gear box 96, and drive screw 98, which engages the steel rod within the second aperture 90 by means of a vertical drive nut 100, as shown in FIGS. 2 and 30, for causing pivotal movement of the rear drive hinge 64 for vertical seat adjustment. The opposing end of the vertical drive assembly 92 is supported on the cross tube 56 for pivotal movement with respect to the cross tube 56.

Returning to FIGS. 12 and 14, the rear drive hinge 64 includes a third aperture 102 formed therethrough for receiving a steel rod for pivotally connecting the motion link 104, shown in FIGS. 1 and 15, to the rear drive hinge 64. As shown in FIG. 1, the motion link 104 includes another steel rod 106 extending therethrough for attachment to the vehicle seat support member 75 (shown schematically in phantom). This motion link 104 allows pivotal movement of the rear drive hinge 64, which enables vertical adjustment of the vehicle support member. The plastic drive hinges 62,64 and plastic motion link 104 provide free relative rotation between the various components, as well as a tight interference fit with the respective support rods for smooth adjustment action.

In order to horizontally adjust the vehicle seat by sliding the inner tubular members 20,22 within the outer members 16,18, a horizontal drive assembly 108 is provided in the center of the seat adjuster assembly 10. The horizontal drive assembly 108 includes a drive motor 110, gear box 112, and drive screw 114. The gear box 112 is connected to the cross rod 54, and the distal end of the drive screw 114 is connected to the cross tube 56 by the T-joint 116, shown in FIGS. 2 and 29. As the drive motor 110 causes the drive screw 114 to rotate, the drive screw 114 is engaged within the horizontal drive bracket 118 such that rotation of the drive screw 114 moves the gear box 112 with respect to the horizontal drive bracket 118, which causes movement of the inner tubular members 20,22, and all components attached thereto, with respect to the stationarily mounted outer members 16,18 as a result of the fixed relationship between the horizontal drive bracket 118 and the outer rail members 16,18.

The horizontal drive bracket 118 is a plastic component shown in greater detail in FIGS. 16–19. The horizontal drive bracket 118 includes opposing ends 120,122 configured for attachment, respectively, to the outer rail members 16,18. The horizontal drive bracket 118 includes a vertical aperture 124 formed therein for receiving a horizontal drive nut 126, shown in FIG. 28. The horizontal drive nut 126 includes a horizontal aperture 128 formed therethrough, which is internally threaded, and configured to align with horizontal aperture 130 of the horizontal drive bracket 118, shown in FIGS. 17 and 19. The threaded horizontal aperture 128 of the horizontal drive nut 126 is configured to cooperate with the drive screw 114 such that rotation of the drive screw 114 causes movement of the horizontal drive nut 126 with respect to the horizontal drive screw 114. A preferred horizontal drive screw 114 is shown in FIG. 27. Alternatively, the horizontal drive nut 126 could be replaced by a gimbal block arrangement, such as that described in commonly owned U.S. patent application Ser. No. 08/552,878, which is hereby incorporated by reference.

Figure 20:
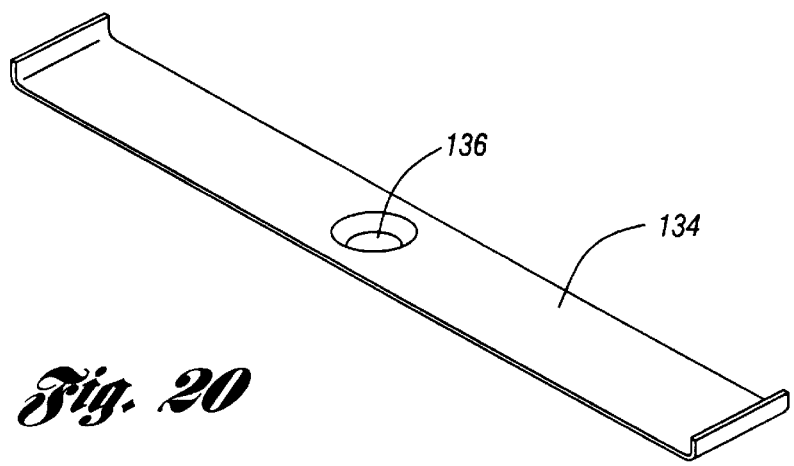
FIG. 20 shows a perspective view of an upper horizontal drive bracket in accordance with the present invention.
Figure 21:
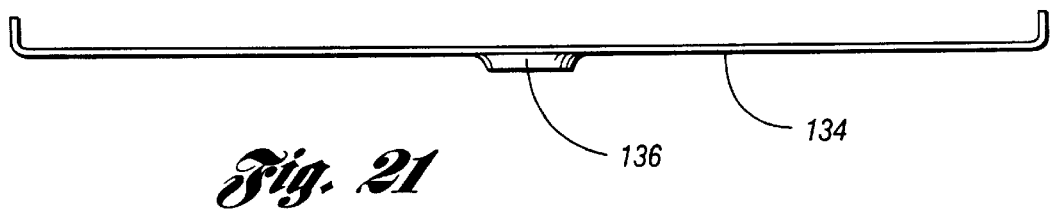
FIG. 21 shows a side view of the upper horizontal drive bracket of FIG. 20.

Referring to FIGS. 1, 20 and 21, an upper horizontal drive bracket 134, which is preferably a sheet metal component, is provided on top of the horizontal drive bracket 118 for added structural integrity, thereby providing even load distribution between the outer members 16,18, and enabling such a single center-driven horizontal motion. The upper horizontal drive bracket 134 includes an aperture 136 for receiving the previously described horizontal drive nut 126. Of course, more than one horizontal drive screw could be used for larger seats.

A preferred horizontal drive assembly 108 is shown in FIGS. 25 and 26. As shown, the drive motor 110, gear box 112, and drive screw 114 are supported upon a support bracket 138 which engages the cross tube 54.

This design substantially reduces cost by reducing part count and eliminating rivets and welds. Because each drive motor assembly is directly mounted to a cross tube, no additional bracketing is needed. Also, because the horizontal drive screw 114 is arranged longitudinally along the length of the power seat adjuster assembly, any crash deformation is in bending, rather than torsion, which adds significant strength to the assembly. Also, the seat belt may be attached directly to the rear cross tube 52 or 54, which eliminates the need for a bracket and adds strength.

While the best mode for carrying out the invention has been described in detail, those familiar with the art to which this invention relates will recognize various alternative designs and embodiments for practicing the invention within the scope of the appended claims.

What is claimed is:

1. A seat adjuster for a vehicle, comprising:

first and second side rail assemblies, each formed of an outer member and a substantially tubular inner member, one of the outer member and inner member affixable to the vehicle, the other of the outer member and inner member movably disposed with respect to said one of the outer member and inner member;

a seat support member;

an elevation assembly, coupled between the seat support member and the movable one of the outer member and inner member for elevating the seat support member relative to the first and second side rail assemblies; and wherein each said outer member comprises an extruded plastic material, and each said inner member comprises a steel tube.

2. The seat adjuster of claim 1, wherein each said outer member comprises a substantially C-shaped cross-section with support ribs therein.

3. The seat adjuster of claim 2, wherein each said outer member further comprises a plurality of longitudinally extending steel support rods therein.

4. The seat adjuster of claim 2, wherein each said outer member comprises an interference fit within the respective inner member.

5. The seat adjuster of claim 1, wherein each said outer member is affixable to the vehicle.

6. The seat adjuster of claim 1, wherein said elevation assembly comprises front and rear plastic drive hinges rotatably connected to opposing ends of the movable one of the inner and outer members.

7. The seat adjuster of claim 6, wherein each said front and rear plastic drive hinge is rotatably connected to the respective opposing ends by means of a non-rotatable cross bar extending between the respective opposing ends.

8. The seat adjuster of claim 1, further comprising first and second cross rods extending between the other of the outer member and inner member; and a horizontal drive mechanism supported by the one of the outer member and inner member and for driving at least one of said first and second cross rods for horizontally driving the other of the inner and outer member.

9. The seat adjuster of claim 8, wherein said horizontal drive mechanism comprises a drive motor, gear box and drive screw centrally mounted to each said cross rod.

10. A seat adjuster for a vehicle, comprising:

first and second side rail assemblies, each formed of at least one outer member and at least one inner member, one of the outer member and inner member affixable to the vehicle, the other of the outer member and inner member movably disposed with respect to the one outer member and inner member;

a seat support member having front and rear ends;

an elevation assembly, coupled between the movable one of the outer member and inner member and the seat support member for elevating the seat support member relative to the first and second side rail assemblies; and the fixed one of the outer member and inner member and the elevation assembly formed substantially of plastic material.

11. The seat adjuster of claim 10, wherein the elevation assembly comprises at least one pair of transverse extending, hingedly connected plastic drive hinges.

12. The seat adjuster of claim 11, further comprising front and rear cross rods hingedly connecting the plastic drive hinges to the inner member.

13. The seat adjuster of claim 12, further comprising drive means, coupled between one of the cross rods and one of the drive hinges, and coupled between the other of the cross rods and the other of the drive hinges, for pivoting the drive hinges to selectively vary an elevation of the front and rear ends of the seat support member.

14. The seat adjuster of claim 13, wherein each said drive means comprises a drive screw, drive motor and gear box fully supported between the respective cross rod and the respective drive hinge without need for further attachment features.

15. The seat adjuster of claim 10, wherein the inner member is substantially tubular.

16. The seat adjuster of claim 15, wherein each said outer member comprises an extruded plastic material, and each said inner member comprises a steel tube.

17. The seat adjuster of claim 16, wherein each said outer member comprises a substantially C-shaped cross-section with support ribs therein.

18. The seat adjuster of claim 17, wherein each said outer member further comprises a plurality of longitudinally extending steel support rods therein.

19. The seat adjuster of claim 15, wherein each said outer member is affixable to the vehicle.

20. The seat adjuster of claim 16, wherein each said outer member comprises an interference fit within the respective inner member.

21. A power seat adjuster for a vehicle, comprising:

first and second side rail assemblies, each formed of an outer member and a substantially tubular inner member, one of the outer member and inner member affixable to the vehicle, the other of the outer member and inner member movably disposed with respect to the one outer member and inner member;

a seat support member;

an elevation assembly, coupled between the movable one of the outer member and inner member and the seat support member, for elevating the seat support member relative to the first and second side rail assemblies; and wherein the fixed one of the outer member and inner member comprises an extruded plastic material of a substantially C-shaped cross-section with support ribs therein.

22. The power seat adjuster of claim 21, wherein each said fixed one of the inner and outer member further comprises a plurality of longitudinally extending steel support rods therein.

23. The power seat adjuster of claim 21, wherein said elevation assembly comprises front and rear plastic drive hinges rotatably connected to opposing ends of the movable one of the inner and outer members.

24. A seat adjuster for a vehicle, comprising:

first and second movable side rail members;

first and second cross members extending between said first and second side rail members, said cross-members being rigidly, non-pivotally mounted to the first and second side rail members;

first and second plastic, piano-type hinges pivotally connected to said first and second cross-members to form a seat elevation assembly, each said piano-type hinge being generally triangular in cross-section and including an aperture at each corner of the triangular cross-section for three pivot attachments.

25. A seat adjuster for a vehicle, comprising:

first and second movable side rail members;

a fixed cross member extending between said first and second movable side rail members for movement therewith;

an elevation assembly connected between said first and second side rail members for vertical seat adjustment; and a drive assembly pivotally mounted to and supported by said fixed crossmember and coupled to said elevation assembly for driving the elevation assembly.

26. The seat adjuster of claim 25, wherein said elevation assembly comprises a plastic piano-type hinge with a non-rotatable rod, said piano-type hinge being generally triangular in cross-section and including an aperture at each corner of the triangular cross-section for three pivot attachments and said drive assembly includes a drive nut pivotally connected to said non-rotatable rod.

27. A horizontal seat adjuster for a vehicle, comprising:

first and second fixed side rails;

first and second movable side rails supported by said first and second fixed side rails, respectively;

first and second cross members extending between said first and second movable side rails;

a horizontal drive bracket extending between said first and second fixed side rails and having a threaded horizontal drive nut supported therein;

a horizontal drive screw supported at opposing ends by said first and second cross members, said horizontal drive screw being engaged with said threaded horizontal drive nut for actuating movement of the first and second movable side rails with respect to the first and second fixed side rails for horizontal seat adjustment; and wherein said horizontal drive bracket comprises a plastic component reinforced by a metal support plate for added structural integrity.

28. The horizontal seat adjuster of claim 27, wherein said horizontal drive screw is centrally positioned between said first and second movable side rails.

29. A seat assembly for a vehicle, comprising:

first and second movable side rail members;

first and second plastic fixed side rail members supporting said first and second movable side rail members, respectively, said fixed side rail members having opposing ends; and front and rear risers supporting said opposing ends of the first and second plastic fixed side rail members, said risers forming pockets to substantially enclose said opposing ends for added structural integrity.

* * * * *